(12) United States Patent
Mollov

(10) Patent No.: US 8,178,847 B2
(45) Date of Patent: May 15, 2012

(54) DATA PROCESSING USING REDUCED ONBOARD MEMORY

(75) Inventor: Todor Mollov, Mountain View, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 927 days.

(21) Appl. No.: 12/187,549

(22) Filed: Aug. 7, 2008

(65) Prior Publication Data

US 2010/0033581 A1 Feb. 11, 2010

(51) Int. Cl.
*H01L 27/146* (2006.01)

(52) U.S. Cl. .................................. 250/370.09

(58) Field of Classification Search ............ 250/370.01–370.15; 378/98.8
See application file for complete search history.

(56) References Cited

U.S. PATENT DOCUMENTS

| | | | |
|---|---|---|---|
| 6,118,846 A * | 9/2000 | Liu ................................. | 378/62 |
| 7,756,617 B1 * | 7/2010 | Cluff et al. ...................... | 701/35 |
| 2002/0118293 A1 * | 8/2002 | Hori et al. ...................... | 348/362 |
| 2003/0043967 A1 * | 3/2003 | Aufrichtig et al. ............. | 378/207 |

* cited by examiner

Primary Examiner — Kiho Kim

(57) ABSTRACT

Raw data (e.g., image data) can be captured and fed into a data processing unit (e.g., a frame grabber), which can process the raw data using data that is retrieved from, for example, the main memory of a computer system instead of from memory onboard the data processing unit. The processed data can then be stored in the main memory or in another memory location.

20 Claims, 3 Drawing Sheets

300

310
RECEIVE PREPROCESSED DATA

320
ACCESS PROCESSING DATA IN MEMORY

330
APPLY PROCESSING DATA TO PRE-PROCESSED DATA

340
SEND PROCESSED DATA TO THE MEMORY

FIG. 3

DATA PROCESSING USING REDUCED ONBOARD MEMORY

TECHNICAL FIELD

Embodiments of the invention relate generally to data processing, such as real-time image processing.

BACKGROUND

Digital imaging units and the like use sensor panels to capture a frame of image data to produce a still picture, or a sequence of such frames to produce a video. A sensor panel may be, for example, a charge-coupled device (CCD) that essentially consists of an array of sensor elements, each element generally equivalent to a pixel.

Variability between sensor elements may introduce biases into the captured image data. The sensor elements in the camera's sensor panel may differ from one another to some degree due to, for example, tolerable variations introduced during fabrication. Thus, for example, if a digital camera is used to take a picture of an object that is a certain shade of red, then some sensor elements may measure shades of red that are different from the actual shade.

There are products known as frame grabbers that can grab or separate an individual frame from a sequence of video frames. A frame grabber is typically implemented as an add-in card that is plugged into the motherboard of a conventional computer system. In some implementations, frame grabbers may process each frame of the image (still or video) data in some manner so that the data can be viewed in a more meaningful way. For example, a sensor panel can be calibrated against benchmark images to quantify a correction factor for each sensor element in the sensor panel. The element-specific (e.g., pixel-by-pixel) correction factors for a particular sensor panel can be loaded into memory onboard the frame grabber and subsequently applied by the frame grabber to the raw image data (e.g., pixel values) captured using that sensor panel. In this manner, the raw image data is corrected so that it more accurately reflects the actual (real world) attributes of an object being imaged.

Unfortunately, a large amount of memory is needed to store the calibration data used to correct the raw image data. Consequently, frame grabbers that provide processing capability can be costly to produce and maintain.

SUMMARY

In general, according to embodiments of the invention, raw data can be fed into a data processing unit, which can process the raw data in combination with data that is retrieved from a memory of a computer system instead of from memory onboard the data processing unit. The processed data can then be stored for subsequent use.

More specifically, in one embodiment, raw image data is captured by an image capture device (or digital imaging unit) and fed into a frame grabber that is coupled to a main memory of a computer system. In such an embodiment, the frame grabber can process the raw data using, for example, calibration data (correction factors) retrieved from the computer system's main memory. Once the raw data is processed, it too can be stored, either in the main memory or in another memory location.

As a result, the amount of memory onboard the printed circuit board for a product such as a frame grabber can be reduced. Reducing the amount of onboard memory may have one or more advantages. In some embodiments of the invention, for example, the cost (and therefore price) of the product (e.g., the frame grabber) and/or the overall complexity of the product can be reduced. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3 is a flowchart of a method of processing data according to an embodiment of the present invention.

Figure 1:
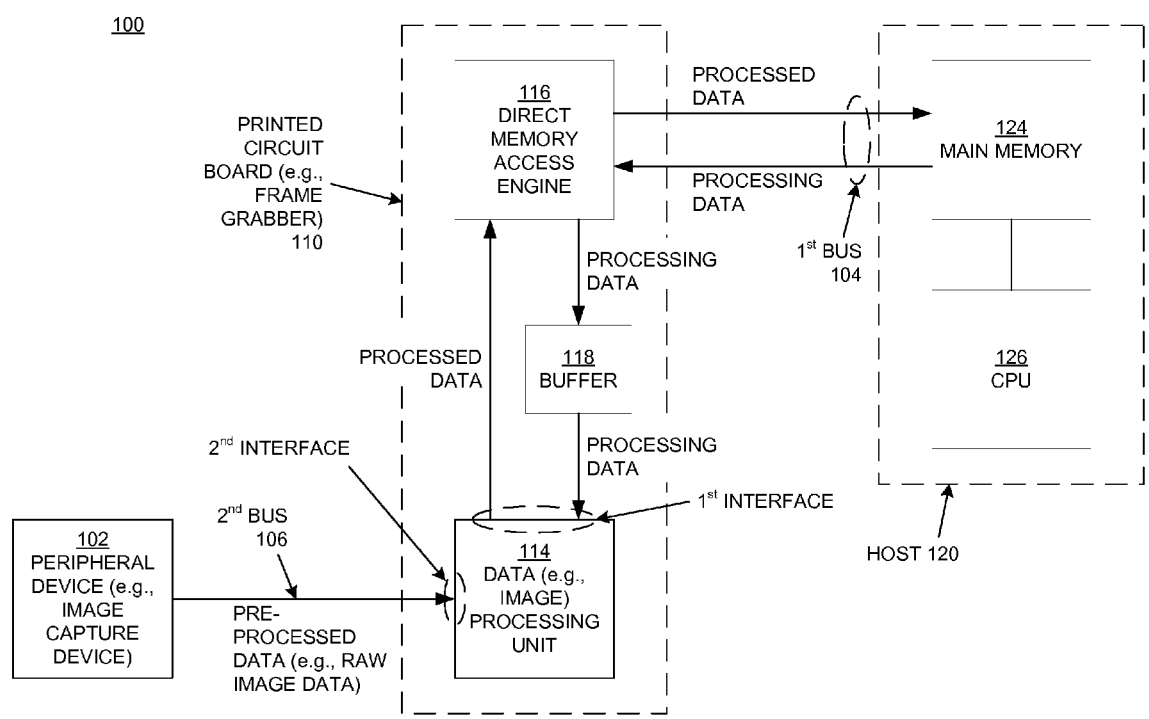
FIG. 1 is a block diagram showing elements of a computer system for processing data according to an embodiment of the present invention.

Unless noted otherwise, the drawings are not to scale.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "accessing," "applying," "sending," "storing," "buffering," "transferring" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a block diagram showing elements of a computer system 100 according to an embodiment of the present invention. The core components of the computer system 100, identified as the host 120, include a main memory 124 (e.g., RAM), a central processing unit (CPU) 126, and other well known components (not shown). The CPU 126 may also be referred to herein as a first processing unit. There may be other memories in addition to the main memory 124.

The computer system 100 includes a printed circuit board (PCB) 110 that is coupled to the host 120 via a first PCB interface that can be connected to a first bus 104. The bus 104 may be any kind of data bus, especially a high bandwidth bus such as a Peripheral Component Interconnect (PCI) or PCI-Express bus, for example.

In one embodiment, the PCB 110 is implemented as an add-in card that is plugged into the motherboard of the computer system 100, although the present invention is not so limited. In one embodiment, the PCB 110 includes components that implement the functionality of a frame grabber.

In the example of FIG. 1, a data processing unit 114, which may also be referred to herein as a second processing unit, is mounted on the PCB 110. In a frame grabber embodiment, the data processing unit 114 may also be referred to as an image processing unit. In one embodiment, the PCB 110 includes a direct memory access (DMA) engine 116, which allows DMA-type transfers of data to and from, for example, the main memory 124. In another embodiment, the PCB 110 also includes a buffer 118, which can be used to buffer data received from the main memory 124 so that the data is ready and waiting when needed by the processing unit 114.

A peripheral device 102 can be coupled to the PCB 110 via a second PCB interface that can be connected to a second bus 106, which may be a Universal Serial Bus (USB), for example. In one embodiment, the peripheral device 102 is a digital image capture device, which may also be referred to as a digital imaging unit. In one such embodiment, the image capture device may be used to take still pictures or videos using visible light. In another such embodiment, the image capture device may be used for fluoroscopic or radioscopic digital imaging. For example, the image capture device may be an x-ray imaging device, which may also be referred to as a digital x-ray image detector.

Preprocessed data (e.g., raw image data) that is captured by the peripheral device 102 is sent over the bus 106 to the PCB (e.g., frame grabber) 110, more specifically to the data (e.g., image) processing unit 114. As described previously herein, the preprocessed data may be biased in some way. The PCB 110—more specifically, the data processing unit 114—operates to adjust the data to correct or compensate for those biases.

The preprocessed data is adjusted by applying or combining the processing data (e.g., calibration data) with the preprocessed data. In one embodiment, the processing data is specific to the peripheral device 102. In other words, if the peripheral device 102 is a digital camera, then the processing data is specific to that particular digital camera—if the first digital camera is replaced with a different digital camera, then processing data specific to the second digital camera is used. The processing data can be generated by the manufacturer of the peripheral device 102, shipped with the product, and downloaded by the end user, for example.

In the FIG. 1 embodiment, the processing (e.g., calibration) data is downloaded to and stored in the main memory 124 instead of in memory that physically resides onboard the PCB 110. Generally speaking, according to embodiments of the invention, the processing data is stored in a memory location that is not onboard the PCB 110—relative to the PCB 110, the processing data is stored offboard. Subsequently, when the processing data is needed, it can be transferred from the offboard location (e.g., the main memory 124) to the PCB 110 (e.g., to the frame grabber) on-the-fly over the bus 104 using some type of high speed transfer such as DMA. The high bandwidth available over the bus 104 allows sufficient data to be provided to the processing unit 114. However, in one embodiment, the buffer 118 can be used to temporarily store a small amount of data that is pre-fetched from the offboard location to ensure that the data is available when needed (see FIG. 2).

By storing the processing data offboard (e.g., in the main memory 124), the amount of memory onboard the PCB 110 can be reduced if not eliminated. Consequently, several sources of increased cost associated with the PCB design are removed. First, the removal of the onboard memory itself decreases cost. Second, the absence of a memory controller decreases cost and also decreases the complexity of the PCB design. Furthermore, the PCB design can be simplified because restrictions imposed by the high clock speeds and large signal count of modern memory can be relaxed or removed. Moreover, the PCB area and number of layers can be reduced, which also can decrease cost. In addition, the useful lifetime of the PCB can be increased—more specifically, a change in memory standards, for example, would not necessarily make the PCB design obsolete.

Figure 2:
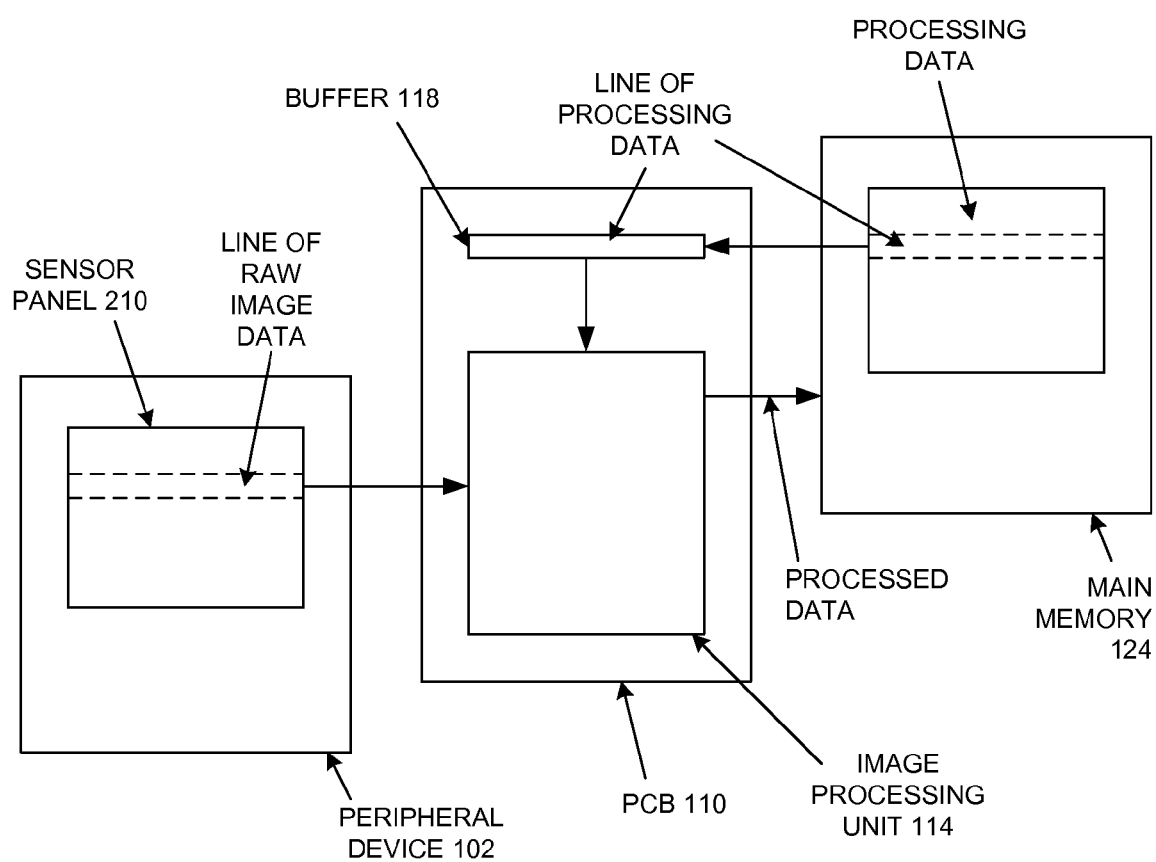
FIG. 2 is a block diagram showing elements of a data processing system according to an embodiment of the present invention.

FIG. 2 is a block diagram showing elements of a data processing system according to an embodiment of the present invention. In the example of FIG. 2, the peripheral device 102 includes a sensor panel 210, which may be a charge-coupled device (CCD) consisting of a columns and rows (lines) of sensor elements. The peripheral device 102 may transfer raw image data a line at a time (in serial fashion) or en masse to the processing unit 114.

In the FIG. 2 embodiment, the main memory 124 includes processing data that is specific to the peripheral device 102, and more particularly, to the sensor panel 210. The processing data, which also may be referred to herein as "first data," may be calibration data that is derived by benchmarking the sensor panel 210 against known standards, for example. Generally speaking, the processing unit 114 combines the processing data and the raw image data, which may also be referred to herein as "second data," to produce processed data that compensates for any biases in the raw image data that may have been introduced by variability in the physical characteristics of the sensor elements that make up the sensor panel 210.

In one embodiment, the buffer 118 is a first-in, first-out (FIFO) buffer, and one line (e.g., a single line) of processing data ("first data") is read from offboard memory (e.g., the main memory 124) and written to the buffer. In other words, just as an instance of raw image data is associated with each sensor element in the sensor panel 210, an instance of processing data is also associated with each sensor element in the sensor panel. Accordingly, there is a row or line of processing data that corresponds to each row or line of the sensor panel 210, and therefore to each row or line of raw image data. The line of processing data that is written to the buffer 118 corresponds to the next line of raw image data to be processed. That is, for example, as the second line of raw image data is processed using the second line of processing data, the third line of processing data is written into the buffer 118. Then, when the third line of processing data is sent to the processing unit 114 in order to process the third line of raw image data, the fourth line of processing data is read into the buffer 118, and so on. In this manner, the processing unit 114 will have the needed processing data on hand.

In an alternate embodiment, the buffer 118 is a double buffer or ping-pong buffer that can hold two lines (e.g., not more than two lines) of processing data (e.g., "first data"). In such an embodiment, one line of the buffer 118 holds processing data that corresponds to the line of raw image data being currently processed by the processing unit 114, while the other line of the buffer holds processing data that corresponds to the next line of raw image data to be processed.

In the embodiment of FIG. 2, after the raw image data is processed using the processing data, the resultant processed data can be written to the main memory 124. The processed data can be transferred to the main memory 124 over the bus 104 using some type of high speed transfer such as DMA. Alternatively, the processed data can be transferred to a memory other than the main memory 124. In general, the processing data can be read from a first offboard memory location (e.g., the main memory 124), and the processed data can be written to a second offboard memory location, which may be in the same memory unit as the first memory location or which may be in a different memory unit.

The processed data can also be immediately rendered and displayed. In essence, the images captured by the image capture device (embodied as peripheral device 102), but corrected to compensate for any biases introduced by the sensor panel 210, can be displayed in real time, or nearly so.

FIG. 3 is a flowchart 300 of a method of processing data according to an embodiment of the present invention. Although specific steps are disclosed in the flowchart 300, such steps are exemplary. That is, the present invention is well-suited to performing various other steps or variations of the steps recited in the flowchart 300. In one embodiment, the method of the flowchart 300 is performed by the PCB 110 of FIGS. 1 and 2, specifically the data processing unit 114 of those figures.

In step 310 of FIG. 3, preprocessed data is received from a peripheral device. In one embodiment, image data is received from an image capture device.

In block 320, processing data associated with the peripheral device is accessed from a memory of a computer system coupled to the peripheral device. In particular, the processing data is accessed from a memory that is not onboard the PCB 110 (FIGS. 1 and 2). In one embodiment, calibration data specifically associated with the image capture device—in particular, with the sensor panel of such a device—is accessed. In one embodiment, a portion of the processing data is buffered.

In block 330 of FIG. 3, the processing data is applied to the preprocessed data to generate processed data. In one embodiment, the calibration data is applied to the raw image data to generate processed image data.

In block 340, the processed data is sent to memory. In one embodiment, the processed image data is sent to the same memory unit in which the calibration data was stored, although the present invention is not so limited. In general, the processed data is sent to a memory that is not onboard the PCB 110 (FIGS. 1 and 2). Instead of storing the data, or along with storing the data, the processed data can be displayed.

By taking advantage of other (offboard) memory resources, the amount of onboard memory required for a product such as a frame grabber can be reduced. Accordingly, the cost (and therefore price) of the product (e.g., the frame grabber) can be reduced. Also, the overall complexity of the product is reduced. Furthermore, the useful lifespan of the product would be expected to increase.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system comprising:
a first processing unit;
a second processing unit coupled to said first processing unit and mounted onboard a printed circuit board;
a first memory unit coupled to said first and second processing units and not mounted onboard said printed circuit board, wherein said second processing unit is operable to produce processed data by combining first data received at said second processing unit from a first memory location in said first memory unit and second data received from a peripheral device; and a buffer coupled to said second processing unit, said buffer for holding an amount of said first data, wherein said second data comprises image data, and wherein said amount of first data corresponds to not more than two lines of an image capture device.

2. The computer system of claim 1 wherein said peripheral device comprises an image capture device.

3. The computer system of claim 2 wherein said image capture device comprises a digital x-ray image detector.

4. The computer system of claim 2 wherein said first data comprises calibration data specific to said image capture device.

5. The computer system of claim 1 wherein said amount of first data corresponds to a single line of said image capture device.

6. The computer system of claim 1 wherein said first data is transferred from said first memory location and said processed data is transferred to said second memory location using a direct memory access engine.

7. The computer system of claim 1 wherein said processed data is sent from said second processing unit to a second memory location.

8. The computer system of claim 7 wherein said second memory location is also in said first memory unit.

9. The computer system of claim 7 wherein said second memory location is in a second memory unit other than said first memory unit, said second memory unit not onboard said printed circuit board.

10. A data processing system comprising:
    an image processing unit mounted on a printed circuit board;
    a first interface coupled to said image processing unit and couplable to a memory of a computer system;
    a second interface coupled to said image processing unit and couplable to an image capture device; wherein image data received from said image capture device via said second interface is combined in said image processing unit with stored data that is received from a first memory location via said first interface, and wherein processed image data is output from said image processing unit to a second memory location via said first interface; and
    a buffer coupled to said image processing unit, said buffer for holding an amount of said stored data, wherein said amount of stored data corresponds to not more than two lines of said image capture device.

11. The system of claim 10 wherein said first memory location and said second memory location respectively reside in memory that is not onboard said printed circuit board.

12. The system of claim 10 wherein said image capture device comprises a digital x-ray image detector.

13. The system of claim 10 wherein said stored data comprises calibration data specific to said image capture device.

14. The system of claim 10 wherein said image processing unit transfers said stored data from said first memory location and said processed image data to said second memory location using direct memory access.

15. The system of claim 10 wherein said amount of stored data corresponds to a single line of said image capture device.

16. A computer-implemented method of processing data, said method comprising:
    receiving image data from an image capture device;
    accessing calibration data associated with said image capture device, said calibration data stored in a first offboard memory location of a computer system coupled to said image capture device;
    combining said calibration data and said image data to modify said image data and generate processed image data;
    sending said processed image data to a second offboard memory location; and
    buffering an amount of said calibration data associated with not more than two lines of said image capture device.

17. The method of claim 16 wherein said image capture device comprises a digital x-ray image detector.

18. The method of claim 16 wherein said calibration data comprises calibration data specific to said image capture device.

19. The method of claim 16 wherein said amount of said calibration data is associated with a single line of said image capture device.

20. The method of claim 16 wherein said accessing comprises a direct memory access transfer of said calibration data to an image data processing unit, wherein further said sending comprises a direct memory access transfer of said processed image data to said second offboard memory location.

* * * * *